US007127705B2

(12) United States Patent
Christfort et al.

(10) Patent No.: US 7,127,705 B2
(45) Date of Patent: Oct. 24, 2006

(54) DEVELOPING APPLICATIONS ONLINE

(75) Inventors: Jacob Christfort, San Francisco, CA (US); Jeremy Chone, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 614 days.

(21) Appl. No.: 09/948,056

(22) Filed: Sep. 5, 2001

(65) Prior Publication Data

US 2002/0078168 A1 Jun. 20, 2002

Related U.S. Application Data

(60) Provisional application No. 60/230,489, filed on Sep. 6, 2000.

(51) Int. Cl.
*G06F 9/44* (2006.01)

(52) U.S. Cl. ............ 717/113; 717/105; 717/106; 717/108; 717/109; 707/4; 707/10; 707/100; 707/513; 707/501.1; 709/217

(58) Field of Classification Search ........ 717/100–118; 709/217–219; 707/3–10, 104.1, 500–501.1, 707/513
See application file for complete search history.

(56) References Cited

U.S. PATENT DOCUMENTS

| 5,572,643 | A | | 11/1996 | Judson |
| 5,603,034 | A | * | 2/1997 | Swanson .................... 717/111 |
| 5,850,433 | A | | 12/1998 | Rondeau |
| 5,850,548 | A | * | 12/1998 | Williams .................... 717/107 |
| 5,887,172 | A | * | 3/1999 | Vasudevan et al. ......... 719/328 |
| 5,933,811 | A | | 8/1999 | Angles et al. |
| 5,937,163 | A | | 8/1999 | Lee et al. |
| 5,960,432 | A | | 9/1999 | Werner |
| 5,991,535 | A | * | 11/1999 | Fowlow et al. ............. 717/107 |
| 6,073,163 | A | * | 6/2000 | Clark et al. ................. 709/203 |
| 6,128,655 | A | | 10/2000 | Fields et al. |

(Continued)

FOREIGN PATENT DOCUMENTS

EP 0367709 A1 10/1989

OTHER PUBLICATIONS

Hemant Kanakia et al., "An Adaptive Congestion Control Scheme for Real-Time Packet Video Transport," SIGCOMM'93, 1993, ACM, pp. 20-31.

(Continued)

*Primary Examiner*—Chameli C. Das
*Assistant Examiner*—Chuck Kendall
(74) *Attorney, Agent, or Firm*—Hickman Palermo Truong & Becker, LLP; Christopher J. Brokaw

(57) ABSTRACT

A method and apparatus for providing a network based operating system for mobile clients is disclosed. Services may be developed that can be used to support different client devices with different capabilities. The services provide output with multiple variations based on different devices, and an intermediary selects the variation best suited for the requesting device. An online software development system is provided to allow services to create, edit, test, and deploy applications at an intermediary using only a browser at the client end. Services may also be provided that can be accessed and referred to by other services, thereby facilitating the combining of different services. Services may also store and access data at an intermediary using variables and a mapping of the stored data to the variables. Data stored at the intermediary may be used to allow an end user to return to a previously accessed service.

10 Claims, 6 Drawing Sheets

U.S. PATENT DOCUMENTS

| | | |
|---|---|---|
| 6,286,029 B1 | 9/2001 | Delph |
| 6,313,835 B1 | 11/2001 | Gever et al. |
| 6,324,681 B1 * | 11/2001 | Sebesta et al. ............ 717/102 |
| 6,345,279 B1 | 2/2002 | Li et al. |
| 6,408,360 B1 | 6/2002 | Chamberlain et al. |
| 6,430,624 B1 | 8/2002 | Jamtgaard et al. |
| 6,477,565 B1 | 11/2002 | Daswani et al. |
| 6,510,469 B1 | 1/2003 | Starnes et al. |
| 6,535,896 B1 | 3/2003 | Britton et al. |
| 6,578,073 B1 | 6/2003 | Starnes et al. |
| 6,584,548 B1 | 6/2003 | Bourne et al. |
| 6,704,776 B1 | 3/2004 | Fortune |
| 6,735,741 B1 | 5/2004 | Pannu |
| 6,757,709 B1 | 6/2004 | Oberdorfer |
| 6,892,226 B1 | 5/2005 | Tso et al. |
| 2001/0029523 A1 | 10/2001 | Mcternan et al. |
| 2001/0047517 A1 | 11/2001 | Christopoulos |
| 2002/0002569 A1 | 1/2002 | Nguyen et al. |
| 2002/0112082 A1 | 8/2002 | Ko et al. |

OTHER PUBLICATIONS

Harini Bharadvaj et al., "An Active Transcoding Proxy to Support Mobile Web Access," 1998, Proceedings of the 17th IEEE Symposium on Reliable Distributed Systems, 6 pages.

* cited by examiner

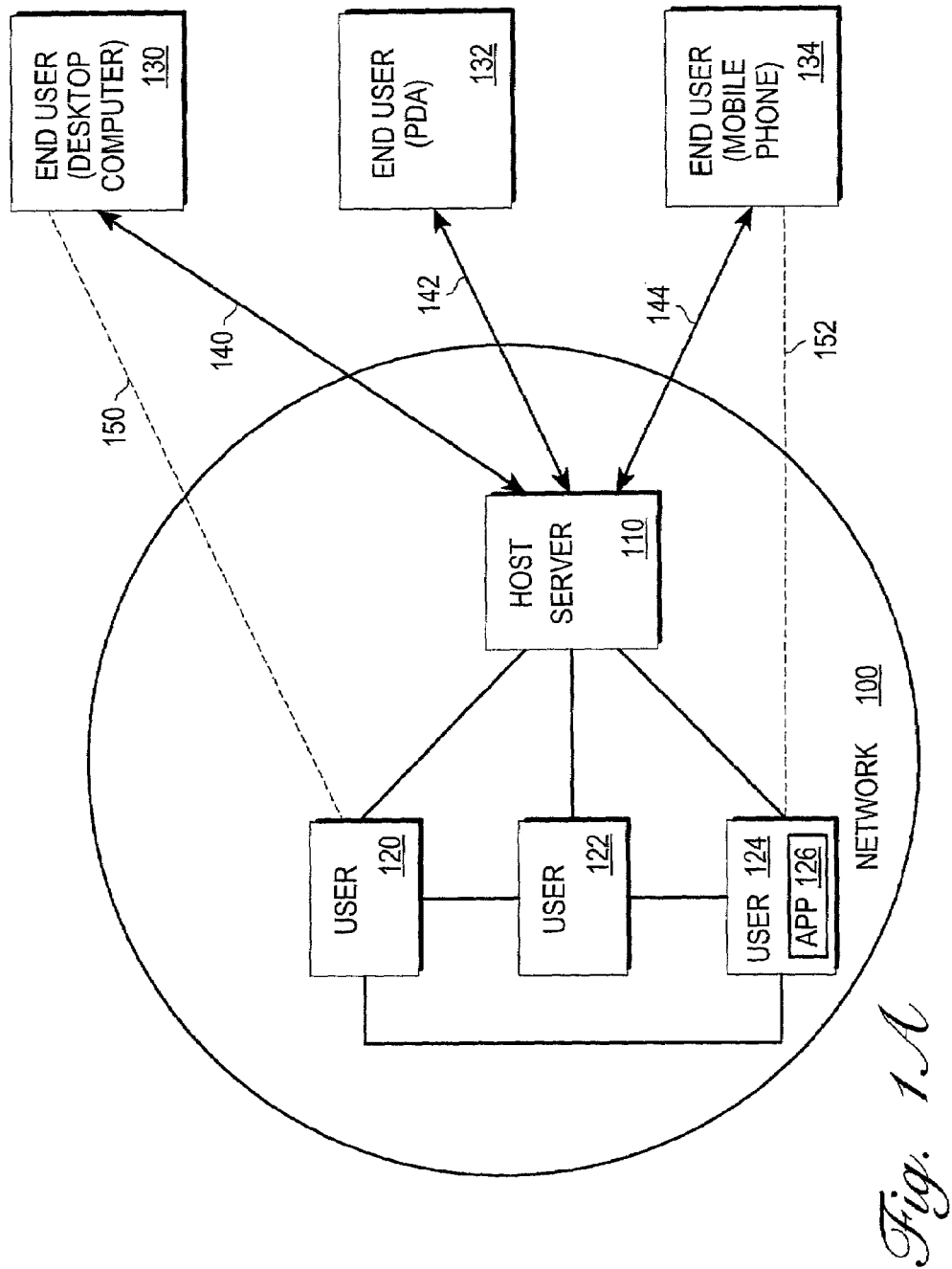

DEVELOPING APPLICATIONS ONLINE

RELATED APPLICATION

This application claims domestic priority from prior U.S. provisional application Ser. No. 60/230,489 filed Sep. 6, 2000, the entire disclosure of which is hereby incorporated by reference as if fully set forth herein.

FIELD OF THE INVENTION

The present invention relates to providing services to clients and, more specifically, to developing applications online.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser.

Another trend is to expand Internet access to devices other than conventional computer systems. For example, many mobile clients (or mobile devices), such as wireless phones, have been developed that include embedded web browsers. Due to size and cost constraints, the "micro browsers" contained in these devices have very limited functionality relative to the browsers that have been developed for full-fledged computer systems. However, devices with embedded micro browsers are usable in circumstances under which using a conventional computer system is impractical.

The number of device types that are able to display web content, in one form or another, continues to increase. For example, there are desktop, laptop and pocket computers, mobile phones, pagers, and personal digital assistants (PDAs) that can be described as "web-enabled" because they are able display web content. As the number of web-enabled device types increases, so does the variation in the capabilities of the devices. For example, general purpose computer systems compensate for their immobility by providing large color screens, sophisticated sound output, significant processing power, ergonomic keyboard input, and an easy-to-use selection device such as a mouse, track ball, or track pad. Conversely, small mobile devices achieve their portability at the expense of screen size and user-input ease-of-use.

Yet another trend is to offer services to clients via a server on a network. Typically the network is the Internet, the client is a user, and the service is available from the server via a website. The service may supply information such as restaurant reviews, weather reports, stock quotations, or news updates. The service may also be more interactive, such as allowing the user to purchase goods, such as books or music, or to purchase services, such as booking travel arrangements. As used herein, the term "service" refers to providing information, functions, or capabilities to a client.

The process by which the user accesses the service depends on the type of client the user has. For example, a desktop computer can connect to the Internet through a dial-up line, a digital subscriber line (DSL), a cable modem, an integrated services digital network (ISDN) connection, or many other available methods. Wireless application protocol (WAP) phones may connect to the Internet over a wireless connection through a WAP-to-HTTP gateway. Generally, the client logs in to the website and is presented with a list of available services, from which the client selects the desired service.

Generally, a service is provided in one of two ways: as a hosted application or as a portal application. With a typical hosted application, a developer creates the application, but a host installs and maintains the application for access by end-users, or customers, on the host network of servers. In contrast, with a typical portal application, the developer both creates the application and deploys it for access by end users, or customers, via one or more servers controlled by the developer. The "developer" referred to herein may be the individual, company, or other entity that provides the service (also referred to as a service provider), or the developer may be another entity providing software development services to the service provider.

A common problem with providing services via applications, whether they are hosted applications or portal applications, is that the application must be designed to work with all devices. However, devices will vary widely in their capabilities based on both the type of device and the particular capabilities of different models of devices of the same type or class of device. For example, a desktop computer will generally have a fully functional web browser, whereas a personal computing device will have a micro browser with limited functionality. Also, some mobile phones may have a limited display that only allows for a single word on each line of the display, while other mobile phones may have a larger display capable of showing several words on each line.

The variation of capabilities can make it difficult for an application developer to support all possible devices. For example, a service may involve the display of graphic images, such as those of products offered for sale, which may be easily viewed on the full function web browser of a desktop computer but which may be incapable of display on a mobile phone. Also, even if the developer is only concerned with a certain type or class of device, the differences in capabilities may be significant. For example, if the application programmer sends output containing multiple words describing several items of information, mobile phones with limited display screens may only be capable of showing the first word of each information item on each line of the display screen, or the output for a single information item will fill multiple lines on the phone display, precluding other information items from being shown simultaneously.

One approach to solving the problem of designing for devices of varying capabilities is to design for the "lowest common denominator." The lowest common denominator approach involves designing the application to work on the most limited device available. For example, if a menu of options is to be displayed on a client device, such as a mobile phone, an application programmer may select short, one-word labels for each of the options because all devices that will use the application can support one-word labels. For example, the application developer may employ the single word menu item "Return" for a mapping application for the option of generating return directions from a selected destination.

However, a drawback of the lowest common denominator approach is that the output does not take advantage of the superior capabilities of other devices. For example, if a client device is capable of displaying a longer label, such as "Generate Return Directions," the longer label would be preferred, since "Return" is ambiguous and may be incorrectly interpreted by the user as meaning "Return to Previous Menu." In addition, the capabilities incorporated into new devices would go largely unused if all applications were targeted to the minimal capabilities of older devices.

An alternative approach to solving the problem of designing for clients or devices of varying capabilities is to design for some intermediate level of capability, such as the most common type of mobile phone. However, an application using this intermediate approach may not function properly on devices with lesser capabilities, and the application will still fail to take advantage of the enhanced capabilities of other devices.

Another problem with providing services via applications is how to support additional devices that become available after the application is developed. For example, several months after release of an application by a service provider, a device manufacturer may release a new device. The new device could be an evolutionary advance over current devices that improves existing features, or the new device could be a more significant advance in that class of device that adds significant new features, or the new device may be a new type of device that adds new capabilities or has a new combination of capabilities.

New devices with improved capabilities can be accommodated by using the lowest common denominator approach, but the enhanced features and capabilities of the new devices, such as larger displays, may go largely unused. For example, if the application only provides one-word menu options, the application will not be taking advantage of an improved device that is able to display multiple word options. Furthermore, with a later released device, the lowest common denominator approach may completely avoid using new capabilities, such as being able to handle voice data or graphics. Even if the application is designed for an intermediate level of capabilities, the application may still fail to fully utilize all of the advances and improvements in future devices that may be created.

Yet another problem with application development is having easy access to the tools available to the developer to create the application. Typically, a developer designing an application for a particular platform (e.g., a combination of hardware, operating system and/or protocols) will utilize a software development kit (SDK). An SDK will generally contain an application programming environment, some commonly used libraries for various features, application programming interfaces, utilities, documentation, a compiler for generating executable code from source code, and a debugger for diagnosing programming problems. To use these tools, the developer obtains the software, documentation, and other materials from an SDK provider, and then the developer installs the software and other tools onto a local computer or network. Later, as the SDK provider makes improvements and upgrades, the developer incorporates such changes into the local installation of the SDK package. Thus, the application developers may have to expend significant resources to install and maintain the SDK. In addition, conventional SDK's typically require significant resources not only for the SDK itself, but also for application development and the infrastructure for the setup, testing, and deployment of the runtime applications.

Individual service providers may want to offer other services that are related to their core services to enhance the overall experience of the customers of the service. For example, if a user seeks out driving directions to a particular destination from one service provider, the driving direction provider may also want to offer the user additional information about the weather or dining options at the particular destination. One way for the driving direction provider to offer such additional information is to create the necessary additional services, which can entail significant additional development resources. Another approach is for the service provider to make arrangements with another service provider to obtain the desired functionality. However, making arrangements with other service providers may involve significant coordination, both in establishing the technical infrastructure to connect the two providers' services and also to establish a means for gauging the level of use by the first provider's customers for billing purposes.

Still another concern with providing services via applications is that the service provider may want to incorporate into the applications durably stored data that is available to the applications when executed. The service provider may then have to incur the burden of establishing and maintaining the stored data so that the data is available when required by the applications.

Based on the foregoing, it is desirable to provide improved techniques for designing applications that more effectively work with all devices. It is also desirable to have improved techniques for creating applications. Further, it is desirable to have improved techniques that allow service providers to offer additional services. Also, it is desirable to have improved techniques for incorporating stored data into an application.

SUMMARY OF THE INVENTION

Techniques are provided for developing applications online. According to one aspect, applications for services are developed online. A request is received from a user running a browser on a client to develop a new application. In response to the request, a first electronic document, such as a web page, is provided to the client for display on the user's browser of an application development interface. The interface may include several types of objects, including an edit field for typing in code for an application. The user submits the application code by selecting an object on the interface, such as a submit button. The application code is stored at a server that is remote from the client and from where the application code may be executed in response to a request for service from an end user. Similarly, the interface may be used to retrieve and edit existing application code, or to test, deploy, or delete existing application code.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a high level overview of a system for providing services via applications accessed through an intermediary, according to one embodiment of the invention;

DETAILED DESCRIPTION OF THE PREFERRED EMBODIMENT

Figure 1B:
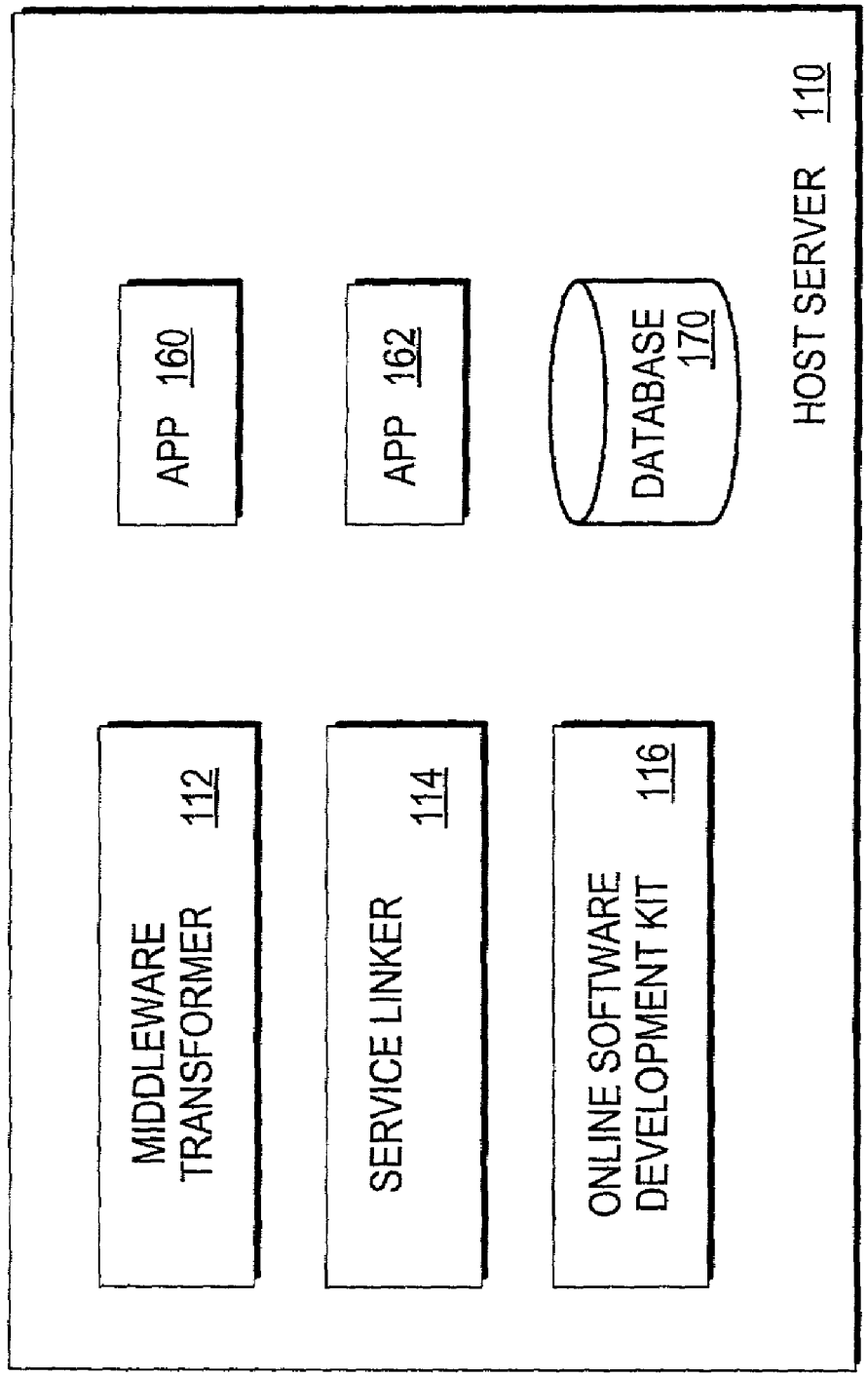
FIG. 1B is a block diagram that illustrates an overview of a host server, according to one embodiment of the invention.

A network based operating system for mobile devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions shall be discussed under topic headings that appear in the following order:

I. STRUCTURAL AND FUNCTIONAL OVERVIEW
  A. Hosting Applications
  B. Customizing Content Provided by a Service
  C. Providing Content from Multiple Services
  D. Accessing Data Stored at an Intermediary from a Service
  E. Developing Applications Online
II. DEVELOPING APPLICATIONS ONLINE
  A. Creating Applications and Services—General
  B. Deploying a Hosted Application
  C. Deploying a Shared Hosted Application
  D. Accessing the New Application or Service
III. GENERATION OF DEVICE-SPECIFIC MARK-UP CODE
  A. Generation of Device-Specific Formatting
  B. Producing Output that Takes into Account Request Conditions
  C. Condition-Independent Output with Embedded Hints
  D. Example of Using Embedded Hints to Identify a Type of Device
  E. Producing Output Based Upon a Condition Hierarchy
  F. Producing Output by Matching Request Conditions
  G. Selecting Output Based on the Language Supported by the Client Device
  H. Using a Middleware Transformer to Transform Condition-Independent Output
  I. Example of Producing Output Using a Shared Hosted Application
IV. ACCESSING OTHER APPLICATIONS AND SERVICES
  A. Mobile Modules
  B. Storing Data at an Intermediary
V. HARDWARE OVERVIEW

I. STRUCTURAL AND FUNCTIONAL OVERVIEW

Techniques are provided for facilitating the creation and deployment of applications that are used to provide services for access by devices such as mobile clients. These techniques include the development of applications that can be executed on a variety of devices by tailoring the output, after it has been generated by the application, based on the particular circumstances of the end user's use of the application, such as the capabilities of a mobile client or the network conditions existing at the time a customer requests service from the application. Also, these techniques include combining the output, capabilities, and features of services together, including techniques for allowing an end user to return to a previously accessed service. In addition, these techniques include storing data at an intermediary for access by the applications associated with a service using variables and a mapping of the variables to the stored data.

Further, these techniques include providing an online software development kit (SDK) so that application developers can create, test, modify, and deploy applications without having any special client-side software. Developers enter code through an interface provided by the website of the SDK over the Internet. Because the website of the SDK is based on XML and HTTP standards, the developer can reuse existing code. For example, if the developer has a Microsoft Internet Information Services (IIS) server that serves ".asp" pages, the online SDK can access the developer's existing server and pages.

As used herein, the term "end user" denotes any person, organization or other entity that may use a device to access a service or application. The term "end user" encompasses the term "customer" although term "customer" does not necessarily imply a commercial relationship with a service provider. Also, the term "end user" is distinguished from the term "user", which as discussed below, refers to developers and service providers that create and maintain the applications, or computer programs, that provide services to the end users.

A. Hosting Applications

FIG. 1A is a block diagram that illustrates a high level overview of a system for providing services via applications accessed through an intermediary, according to one embodiment of the invention. FIG. 1 shows a network 100 that includes a host server 110. Network 100 may be any type of network, including but not limited to a private network, such as an intranet, a public network, such as the Internet, or a combination of different networks and network types.

Host server 110 may be implemented on one or more servers at an intermediary, such as a hosting service provider, also known as a host provider or simply as a host. The function of the host is to install and maintain applications, such as on host server 110, that are developed by either the host provider or other application developers. The applications are typically part of a service, such as a web site, a paging service, or a telecommunications service. The host may also provide "partial" or "shared" hosting of applications in which the applications are stored on servers associated with the application developer or service provider, but the applications may be accessed via the host. Partial or shared hosting of applications is distinguished from portal applications that are stored on servers associated with the application developer or service provider but which are not accessed via the host. End users access the services offered by other parties and companies via the host by interacting with the hosted and partially hosted applications.

Network 100 also includes users 120, 122, 124 that are interconnected with host server 110 and each other on network 100 as illustrated. In FIG. 1A, users 120, 122, 124 may be service providers that offer services for use by end users. Users 120, 122, 124 may also be application developers, who may be part of or associated with the service providers. The service providers, application developers, and other parties create and maintain applications that are part of a service offered to end users.

The applications that are part of a service may be hosted by the hosting provider, such as on host server 110. The applications may also be partially hosted by being stored at a server associated with a user, as illustrated by an application 126 that is included with user 124, and being accessed via the hosting provider, such as via host server 110.

B. Customizing Content Provided by a Service

FIG. 1A also illustrates end users 130, 132, 134 that are connected to host server 110 by connections 140, 142, 144. Although end users 130, 132, 134 are shown external to network 100 in FIG. 1, end users 130, 132, 134 or other end users not shown may also be part of network 100. There are a number of different types of end users and connections. For example, end user 130 may be a desktop computer that is connected to host server 110 through a variety of ways, such as via the Internet, a DSL connection, or an ISDN. Also, end user 132 may be a PDA that is connected to host server 110 via a cellular modem connection. Further, end user 134 may be a mobile phone that is connected to the Internet and thereby to host server 110 via a WAP-to-HTTP gateway.

FIG. 1A also shows a connection 150 between end user 130 and user 120, and a connection 152 between end user 134 and a user 124. Connections 150 and 152 permit direct communication between the end users and the users, thus illustrating that not all communications between end users and users pass through host server 110. For example, end user 130 may be a desktop computer and therefore is able to interact directly with user 120 when requesting a service. However, the service that end user 130 requests from user 120 may be supplied by a hosted application located on host server 110. In response to the service request from end user 130, user 120 may send a request to host server 110 to provide end user 130 with output from the hosted application via connection that satisfies the request. In response to the request from user 120, host server 110 may then execute the appropriate hosted application and send the resulting output to end user 130 over connection 140.

As another example, end user 134 may be a mobile phone that is interacting with host server 110. End user 134 may request via host server 110 a service that is supplied by a shared hosted application, such as application 126 that is served from user 124. The host server 110 then passes along the request for service from end user 134 to user 124. User 124 then executes the appropriate application, such as application 126, and sends the resulting output to end user 134 over connection 152.

FIG. 1A illustrates a representative embodiment of a system for providing a network based operating system for mobile devices, while in practice much larger and more complex networks featuring a number of variations of the configuration shown in FIG. 1A may be used. For example, a network based operating system for mobile devices may involve more than one server associated with the host and virtually unlimited numbers of users and end users. Also, not all users may be included in a single network, such as network 100. Instead, users may be located in many networks, including the Internet and intranets. Similarly, end users may be located within a network that also includes the host server and one or more users. In addition, the host provider may offer services directly to end users, in addition to hosting applications by others. Further, the types of end users, users, and connections discussed above are only representative examples.

FIG. 1B is a block diagram that illustrates an overview of host server 110, according to one embodiment of the invention. Host server 110 includes applications 160, 162 that may be hosted applications stored on host server 110 or links to shared hosted applications stored on other servers, similar to application 126.

Host server 110 includes a middleware transformer 112 for transforming application output into output that is tailored or customized based on parameters or conditions associated with a service request. For example, the capabilities of the client devices used by end users may vary widely. According to one embodiment, the application developer designs the application to produce generic output that includes several output variations, also referred to as output segments, for presenting or displaying the output on the client device. The generic output is received by middleware transformer 112. The middleware transformer 112 also receives or detects the parameters or conditions associated with the service request. Middleware transformer 112 then selects a particular output variation or option based on the parameters or conditions of the service request.

For example, the client, or end user, may be a mobile phone that is requesting driving directions from a map service provider. The mobile phone may not be capable of displaying graphics, and therefore the map service provider need only supply a response to the request that includes text, not graphics, showing the desired route. However, the map service provider may have other customers that use other devices, such as laptop computers, that are capable of displaying graphics in addition to text.

The application used by the map service provider may therefore generate generic output that includes several variations of the requested directions, such as one output segment with text only and one with text and graphics. The application provides the generic output to middleware transformer 112, which also receives parameters or information from the request, such as data that indicates that the client device is a mobile phone. Middleware transformer 112 then selects the output segment with text only from the generic output and generates customized output that contains the text only output segment from the application, and then middleware transformer sends the customized output to the end user. In another embodiment, the application produces a comprehensive set of output that is customized or formatted by middleware transformer 112 based on a style sheet selected based on the client device.

The approach of using a host to receive generic output and generate customized output provides several benefits. For example, the application developer does not have to write different applications, or different output routines, for each specific condition that may merit changes to the output. In fact, the application developer does not even have to be able to test for those conditions. Rather, the application developer may write one application with output variations for each of the special conditions, which may include the specific model of the client device, the type of the client device, and broad or narrow class of the client device, the network conditions, etc. As new devices and capabilities are introduced, the middleware transformer can select the output variation that best matches the capabilities of the new client devices.

As another example, the output segments may depend on conditions that exist at the time of the request, such as network congestion, the time of the request, or the location of the user, which allow the middleware transformer to select an output variation or to format the output by taking into account such conditions. Therefore, the application developer may design the application to provide generic output that includes output segments for each of a variety of conditions and then allow the host to select the particular output that is to be provided to the end user based on the particular conditions for the particular request.

C. Providing Content from Multiple Services

Host server 110 also includes a service linker 114 for handling requests from end users for service and forwarding the requests to the appropriate service or application for a response. In addition, service linker 114 can keep the session (or transaction) of other services active. For example, an end user may be a mobile phone that is communicating with the host. The host provides the end user with a list of service options that may include a map service. When the end user selects the map service using the mobile phone, service linker 114 receives the request from the end user and forwards the request to the provider of the appropriate service. For example, if the service is supplied using a shared hosted application, the request may be forwarded to a server associated with the map service provider over the World Wide Web. The response to the request from the shared hosted application may be received at the host in the form of generic output that is customized for the mobile phone, such as by using a middleware transformer as discussed above.

In another embodiment, applications incorporate the features and output of other applications. The applications may also be referred to as mobile modules or simply modules. For example, if application 160 in FIG. 1 B provides map directions, the map service provider may also want to include information regarding the weather at the destination location specified by the end user. Instead of developing a separate weather application, the map service provider may link to another hosted or shared hosted application provided by a weather information service provider that is associated with host server 110. For example, application 162 may be a weather application or module provided by a different company than the company providing the map service. However, because both companies have modules associated with the host server, both may include links to the other company's modules in the output of each company's application. Based on the links, the middleware transformer may incorporate output from one application into another, or a link may be presented to the end user to allow access to the features of another service.

In addition, because the host server handles the interaction between the two services, the host can track which modules are called by each other to facilitate billing between the services. Furthermore, this tracking feature allows one module to call back to another module without being aware of the identity of the other module. For example, if a first module calls a second module, the tracking feature allows the second module to call back the first. As a result, any service can be used as a module, which may be described as providing a reusable web service to other services.

D. Accessing Data Stored at an Intermediary from a Service

Host server 110 also includes a database 170 to support storage of data at the host by the services for use by the services' applications. Although database 170 is shown as part of host server 110, database 170 may also be supported by another server or other device suitable for providing database functions. Database 170 may include a data structure for storing data and also a mapping of variables, or identifiers, to specific data, or information items. Services may use database 170 to durably store and maintain information at the host server, thereby freeing the services of the obligation to support such a database themselves. For example, an application may generate output with an identifier "%xyzlogo" that is identified in the mapping as corresponding to a particular graphical image of the XYZ Company stored in database 170. As another example, the application's output may include a variable "%date" to denote the current date when the application is accessed in response to a request from an end user. Upon receipt of the output at the middleware transformer, the current date is substituted in the output for the variable %date.

E. Developing Applications Online

Host server 110 also includes an online software development kit 116 that services and application that developers may use to create, edit, test, deploy, and otherwise manage applications or modules associated with the hosting service. According to one embodiment, an application developer uses a browser to log into an online development website associated with the hosting service to access online software development kit 116. After logging in, online software development kit 116 provides a user interface for display on the developer's web browser. The user interface presents the user with various options, such as creating a new application, modifying an existing application, testing an application, or deleting an existing application. For example, to create a hosted application, the developer enters or modifies program code using the user interface via the developer's browser and then saves the code at host server 110 under a module or application name, or identifier. If the developer wishes to establish a shared hosted application, the developer logs into the online development website and provides a URL of the application. The hosted and shared hosted applications may then be made immediately available for use. For example, end users may log into the service provider via a website to access a list of available services.

II. DEVELOPING APPLICATIONS ONLINE

A. Creating Applications and Services—General

According to one embodiment, a developer uses a browser running on a client to log on to a website through which the developer can access the tools necessary to develop an application without any special client-side SDK software. The website may be referred to as a development website, or as an "SDK website" when, for example, the website provides, or hosts, an online software development kit (SDK).

As used herein, a "developer" is synonymous with both a "service provider" and a "user" (since the developer makes use of the online development website). Also, a "user" is distinguished from an end-user or a customer that uses the service provided by the developer.

The provider of the application development tools and host of the online development website may be referred to as the development provider, SDK provider, or simply as the host. The development provider typically uses one or more servers to support the development website and the tools provided thereby.

Access to the development website may be controlled by requiring the user to have a name and password. After the user has gained access to the website, the user may be presented with a list of mobile applications (also referred to herein as services), that the developer or user has previously created. The user may also have access to other services, such as samples provided by the development website provider. The development website may present the user with several options, such as to add a new service, modify an existing service, or delete an existing service. For example, if the user selects the "add service" option, the user is presented with a user interface that allows the user to add a service.

According to one embodiment, a service may be either a hosted application or a portal application. A hosted application is an application whose code is maintained at the development website, also referred to as the host website. A portal application is an application whose code is maintained at another website associated with the portal application developer and may typically be accessed by customers or end users via the developer's website. However, according to another embodiment, a portal application may also be accessed or served to clients through the development website, in which case the portal application may be referred to as a "shared hosted application" or a "partially hosted application."

B. Deploying a Hosted Application

The deployment of a hosted application may involve several steps, such as initially creating the application, subsequently editing of the application, and testing of the application. In one embodiment, to create a hosted application, the development website provides the developer or user with an interface for writing and editing code for the application. The interface may include an editing window or edit field that the user may use to type in the code for the application. Similarly, to edit an existing application, the user is presented with an interface that displays the existing application code to the user in an editing window that allows the user to edit the code of the selected application.

Application code can be written in an appropriate mark-up language (ML), such as the extensible markup language (XML). According to one embodiment, the code is written in a mark-up language referred to herein as "portal-to-go XML". "Portal-to-go" and "Portal-to-go XML" may also be referred to as Oracle9iASWireless and Oracle9iASWireless XML (or just IASWireless XML), respectively.

Portal-to-go XML consists of a set of XML tags that may be used to indicate boundaries between alternate output segments. Each output segment in a set of output segments may be specifically designed for certain devices, such as mobile devices that typically have small screens, and others with voice capabilities.

Portal-to-go XML can be generated by any of the traditional means of generating dynamic HTML, such as JavaServer Pages, CGI, or Active Server Pages, such that instead of generating HTML, the code or script generates Portal-to-Go XML. The details of such a markup language such as Portal-to-go XML may be defined in a Document Type Definition (DTD). For example, a DTD of portal-to-go XML as implemented in one embodiment is described in U.S. provisional application Ser. No. 60/230,489, filed Sep. 6, 2000.

Accorded to another embodiment, both the application code for a hosted application and the code that causes the generation of the user interface used to enter and edit the code are stored on one or more servers associated with the development provider. Consequently, the only client-side software required to develop and deploy a mobile application is a web browser, such as Netscape Navigator.

When the user finishes inputting the code for a new application or editing the code for an existing application, the user can save the code shown in the interface. The "save" code function may be an object, such as a button, included in the interface. By clicking on the object, the code is submitted, or sent, to a server remote from the client, such as a server associated with the development provider. If a new application is being created, the user specifies a service name and the code is saved in association with the service name. After saving the new code, the new service name will be displayed in a list of existing services shown when users and end users log into the development website. If an existing application is being modified, the user may choose to save the code under the existing service name or under a new service name.

To test the application, the user can access the application or service via the development website using a mobile device or a mobile device simulator. This is discussed in more detail below under "Accessing the New Application or Service." The hosted application that is deployed via the development website is immediately available to the user for testing and to end users for use via the host website.

C. Deploying a Shared Hosted Application

In another embodiment, to create a shared hosted application, the user writes either a portal-to-go XML document or an application program that generates a portal-to-go XML document as output. The terms "partially hosted application" or the "shared hosted application" may be used to refer either to the XML document or the application that generates an XML document as output. The shared hosted application may be saved, for example, at the application developer's own website. The user then associates a URL with the shared hosted application using, for example, an HTTP listener/web server that services the application developer's web site. The shared hosted application is then added as a "service" by logging into the development website, or the SDK website, and providing the name of the service and the URL associated with the shared hosted application.

D. Accessing the New Application or Service

As soon as a service has been created and/or revised, end users or customers that can connect to the network on which the server resides (e.g., the Internet) can access the service.

The process by which the service is accessed may vary based on the type of end user. For example, a desktop computer can connect to the Internet through a dial-up line, a DSL connection, a cable modem, an ISDN connection or many other available methods. WAP phones may connect to the Internet over a wireless connection using a synchronous protocol, such as through a WAP-to-HTTP gateway, or using an asynchronous protocol, such as the simple mail transfer protocol (SMTP) or the short message service (SMS) protocol.

In general, the end user logs in to the development website and is presented with a list of available services. The end user may select the service that was just created and/or modified. In response to the selection of a service, the application associated with the service is obtained. The application may be associated with a portal-to-go XML document or another document written in a suitable markup language. For example, with hosted applications, the XML may be obtained by retrieving the portal-to-go XML that was saved at a server associated with the intermediary (e.g., the host). For portal applications, a request may be sent to the URL that was specified by the developer for the service. The web server that manages that URL may invoke the portal application and send the portal-to-go XML associated with the portal application back to the server associated with the intermediary. Once the portal-to-go XML for the service is obtained for either a hosted or portal application, the server associated with the intermediary uses the portal-to-go XML to provide the selected service to the client associated with the end user.

III. GENERATION OF DEVICE-SPECIFIC MARK-UP CODE

A. Generation of Device-Specific Formatting

According to one embodiment, the mark-up language output, such as portal-to-go XML, is produced by a service without regard to the type of client device that is invoking the service. According to one embodiment, prior to providing the output to a client, one or more extensible stylesheet language (XSL) style sheets are selected based on the device type of the client. XSL style sheets are discussed in more detail in U.S. application Ser. No. 09/631,884, filed Aug. 4, 2000, the entire disclosure of which is hereby incorporated by reference as if fully set forth herein.

The selected style sheets are applied to the XML output from the service to produce customized output that is specifically formatted for the client that requested the service. For example, the same XML output by a mobile application may ultimately be manifested in the following three ways, depending on the type of client that requested the service: (1) a list of options on the display of a mobile phone, (2) a pull-down menu on a browser, and (3) an orally presented list of options on the voice interface of a telephone. The application developer achieves any-device support without having to do any special programming because the applications are designed to produce the same XML output regardless of the device used to request the service and since the device-specific formatting takes place outside the applications, such as by an intermediary applying device-specific XSL style sheets.

Further, because the execution of the code and the application of XSL style sheets to the output thereof occur via the host, all hosted and portal applications automatically gain device-specific support for new devices whenever the host installs XSL style sheets for the new devices. The application developer need not make any changes to the application code to support any additional or newly developed client devices. Of course, if the developer wants to take advantage of improved or added capabilities, the developer may update the application to provide addition output segments or variations for such capabilities.

B. Producing Output that Takes into Account Request Conditions

Another problem with providing services via applications is that the applications function the same regardless of the specific circumstances existing at the time when the applications are used. For example, it may be desirable to modify the application's output based on the congestion of the network at the time a user accesses the application. If the network is heavily congested, it may be better to limit the amount of detail provided in the output being provided during such times of heavy congestion. Again, the application programmer can take the lowest common denominator approach and design the application for the worst-case conditions. However, this approach fails to take advantage of improved conditions when they exist at other times. If the programmer selects a higher level of detail, then the ability of the application to deliver output to the client device will suffer during periods of heavy network congestion.

Techniques are provided for producing output that takes into account conditions, parameters, and characteristics associated with a service request (which are also referred to as "request-conditions"). Request-conditions may include, for example, information about the type of client that is requesting the service, such as a device type, or environmental conditions, such as the time at which the service request is made or responded to, or the congestion on the network over which the service is requested or supplied.

According to one embodiment, an application program continues to generate the same output regardless of the request-conditions. Because the output of the application is the same regardless of request-conditions, it is referred to herein as "condition-independent output".

According to another embodiment, the condition-independent output produced by an application contains "hints" (or criteria, conditions or other guidance) as to how the output should be processed under certain request-conditions. A middleware transformer is provided that receives the condition-independent output and uses the hints contained therein, along with knowledge of the client and request-conditions, to transform the condition-independent output into "condition-specific output," which may also be referred to as "condition-dependent output." The condition-specific output is then provided to the client that requested the service that produced the output. The middleware transformer typically is associated with the host and may be provided by a server associated with a host, but the middleware transformer is not limited to implementations associated with the host.

C. Condition-Independent Output with Embedded Hints

According to one embodiment, application programmers design applications to generate output that contains "hints" about how the output should be transformed based on request-conditions. According to one implementation, the application programmer designs the application to generate output that designates several variations of the output that satisfies a request to the application that resulted in the generation of the output. The variations of the output may also be referred to as alternative output segments.

The output from the application also includes one or more particular criteria or conditions that are associated with each of the alternative output segments. A middleware transformer is used to select the alternative output segment that best matches the request conditions to the criteria or conditions that are associated with each alternative output segment. A match may be determined based on whether the condition or conditions associated with a particular alternative output segment are satisfied or not satisfied (or whether the conditions are true or false).

For example, if the application output is in the form of a mark-up language, such as XML, the output may include a section of code that has the form:

```
<section>
   <condition 1>
   Use this when Condition 1 is true
   </condition 1>
   <condition 2>
   Use this when Condition 2 is true and Condition 3 is not
      true
      <condition 3>
      use this when Condition 3 is true
      </condition 3>
   </condition 2>
   Use this for Every Other Condition
</section>
```

The application generates the output above without regard to the request-conditions that will exist at the time a request for a service is made by an end-user. The middleware transformer determines whether any of conditions 1, 2 and 3 are true after receiving the condition-independent output from the application. For this example, if condition 1 is true, then the middleware transformer transforms the condition-independent output to produce the following condition-dependent output:

```
<section>
   Use this when Condition 1 is true
</section>
```

If condition 2 is true but condition 3 is not true, then the middleware transformer transforms the condition-independent output to produce the following condition-dependent output:

```
<section>
   Use this when Condition 2 is true and Condition 3 is not
      true
</section>
```

If condition 2 and 3 are true, then the middleware transformer transforms the condition-independent output to produce the following condition-dependent output:

```
<section>
   use this when Condition 3 is true
</section>
```

If conditions 1 and 2 are not true, then the middleware transformer transforms the condition-independent output to produce the following condition-dependent output:

```
<section>
   Use this for Every Other Condition
</section>
```

In this example, conditions 2 and 3 are related to each other. Specifically, the output segment associated with condition 3 is not executed unless both conditions 2 and 3 are true.

The technique of specifying a hierarchy between conditions may be used, for example, when one condition is a subset of another condition. For example, condition 2 may be that the network is experiencing an unusual amount of traffic (e.g., network congestion) as compared to a threshold amount, and condition 3 may be that the network traffic is extremely heavy as evidenced by exceeding a specified limit. Therefore, for normal network congestion, when condition 2 is true but not condition 3, the actual instruction or statement corresponding to "use this when Condition 2 is true and Condition 3 is not true" may specify that no unusually detailed graphics should be transmitted. And if condition 3 is true, such as might be the case for extreme network congestion, the actual instruction or statement corresponding to "use this when Condition 3 is true" may specify that no graphics should be transmitted.

The use of condition-independent output with embedded hints allows the application developer to design flexibility into the service application to handle variables that may only be known at the time a client requests service from the application. Incorporating flexibility into the application output avoids the drawbacks of the lowest common denominator approach by allowing the application to adjust the output for optimal performance based on the circumstances existing at the time of the client's request to the application. Furthermore, the application itself need not have the ability to detect the conditions upon which alternative output segments are selected, since the host will handle that function.

D. Example of Using Embedded Hints to Identify a Type of Device

For the purpose of explanation, an implementation shall be described in which the conditions associated with the alternative output segments are the device type of the requesting client. In such an implementation, the condition-independent output generated by an application may have the form:

```
<section>
   <desktop>
   Use this when the client is a desktop computer
   </desktop>
   <phone>
   Use this when the client is a phone
      <WAP>
      use this when the client is a WAP phone
      </WAP>
   </phone>
   Use this for Every Other Device
</section>
```

The application generates this output without regard to the request-conditions. Upon receiving the condition-independent output from the application, the middleware transformer determines whether the client corresponds to any of the alternative-segment tags. For example, using the XML output above, if the client is a desktop computer, then the client matches the <desktop> tag and the middleware transformer transforms the condition-independent output to produce the following condition-dependent output:

```
<section>
   Use this when the client is a desktop computer
</section>
```

If the client is a phone, but is not a WAP phone, then the client matches the <phone> tag and the middleware transformer transforms the condition-independent output to produce the following condition-dependent output:

```
<section>
    Use this when the client is a phone
</section>
```

If the client is a WAP phone, then the client matches both the <phone> tag and the <WAP> tag. The <WAP> tag is more specific than the <phone> tag, so the middleware transformer transforms the condition-independent output to produce the following condition-dependent output:

```
<section>
    use this when the client is a WAP phone
</section>
```

If the client is neither a desktop computer nor a phone, then the client does not match any of the alternative-segment tags and the middleware transformer transforms the condition-independent output to produce the following condition-dependent output:

```
<section>
    Use this for Every Other Device
</section>
```

The approach of using embedded hints to identify a type of device allows the application developer to write one set of code that can be used with all devices, yet the application code may contain alternative segment tags to customize the applications output for different devices that have varying capabilities. In the example above, if the client device is a desktop computer, full text, graphics, and sound content can be sent since a desktop computer can easily handle all three types of content. But if the client device is a mobile phone, then perhaps no graphics will be sent since a mobile phone is unlikely to be capable of showing such graphics on its display. Further, if the phone happens to be a WAP phone in the above example, the application can produce output specific to the WAP protocol.

Furthermore, if the client device is not one of those listed, a default configuration for the output can be used (e.g., the "Use this for Every Other Device" alternative segment tag above). A default condition may specify output based on the lowest common denominator approach so that any client can handle the output. However, the application developer need not rely on such a default configuration if the device happens to be one of the types specifically provided for, such as a desktop device, a phone, or a WAP phone. Finally, client devices that are created after the application is complete can still receive output that takes advantage of their increased capabilities if they fall into one of the specified device types, such as a desktop computer or phone in the above example. Therefore, future devices need not be forced to use the most basic or default output just because the future device was unknown to the application developer when writing the code for that service.

E. Producing Output Based Upon a Condition Hierarchy

According to one embodiment, a programming language is provided that supports alternative-segment tags that correspond to nodes in a condition hierarchy. The most general ("highest") node in the condition hierarchy is the default node. The other nodes correspond to specific conditions. The most specific nodes in the condition hierarchy may correspond, for example, to specific models of a device, or even specific versions of specific models. Other intermediate nodes may correspond to classes or types of devices, such as mobile phones or pagers.

According to one embodiment, the nodes in the condition hierarchy are associated with each other according to parent-child relationships, where all child nodes of a given parent correspond to subcategories of the category associated with the parent.

Figure 2:
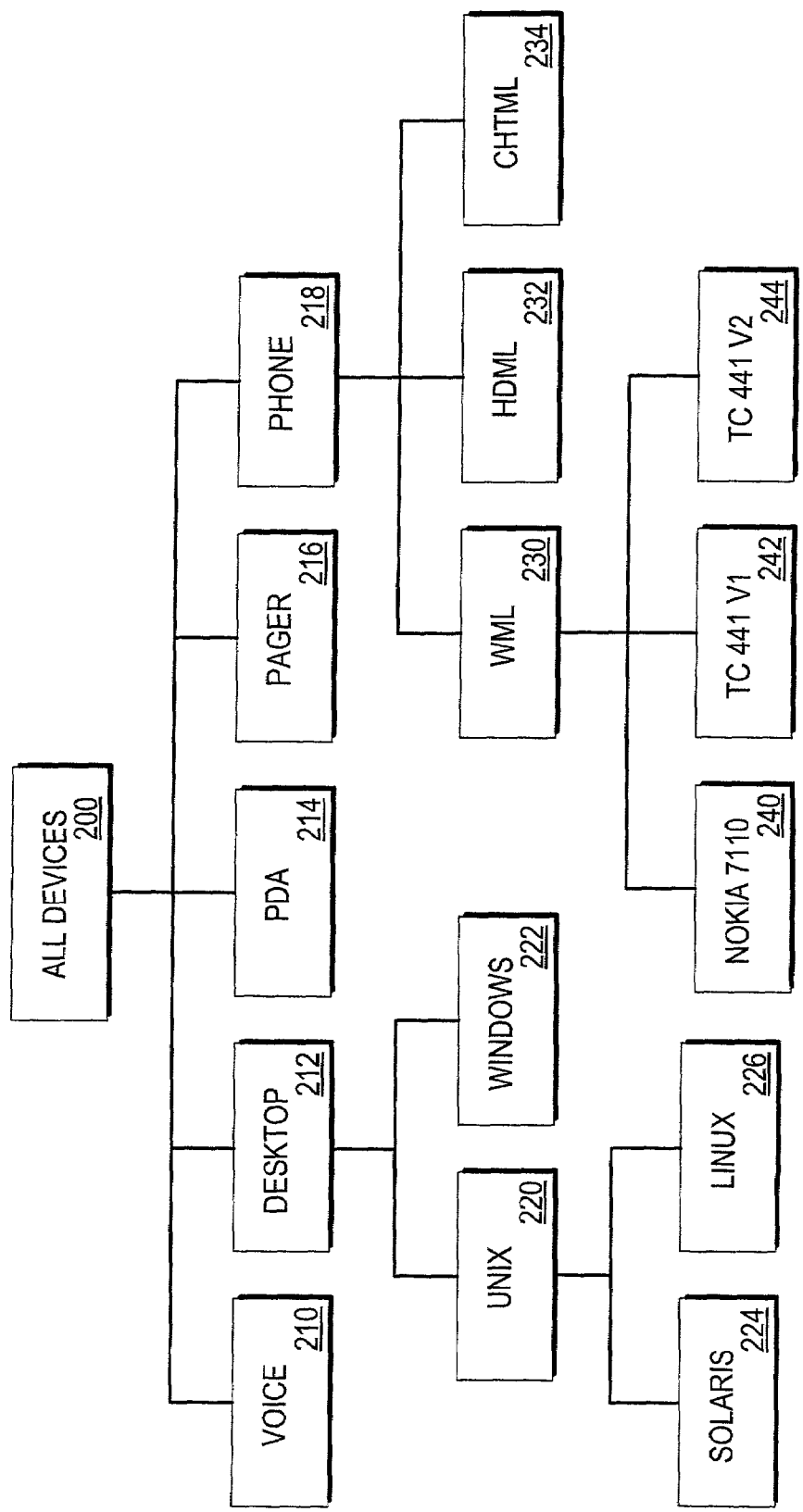
FIG. 2 is a block diagram illustrates a condition hierarchy, according to one embodiment of the invention.

FIG. 2 illustrates one such condition hierarchy. 1 FIG. 2, an "all devices" node 200 in the illustrated hierarchy is the highest or default node. All devices node 200 has below it several child nodes, specifically a "voice" node 210, a "desktop" node 212, a "PDA" node 214, a "pager" node 216, and a "phone" node 218, which correspond to broad classifications of the types of devices that may access a service.

Desktop node 212 also has its own child nodes, specifically a "Unix" node 220 and a "windows" node 222, that correspond to two examples of desktop operating systems. Similarly, Unix node 220 has two child nodes, a "Solaris" node 224 and a "Linux" node 226, which correspond to two versions of the Unix operating system. Likewise, phone node 218 has several child nodes, specifically a "WML" node 230, an "HDML" node 232, and a "CHTML" node 234, which correspond, respectively, to phones using the wireless markup language (WML), the handheld device markup language (HDML), and the compact hypertext markup language (CHTML). Similarly, WML node 230 has three child nodes: a "Nokia 7110" node 240, a "TC 4411 V1" node 242, and a TC 4411 V2 node 244, which correspond, respectively, to a Nokia model 7110 mobile phone, and versions 1 and 2 of the TC model 4411 phone.

Given the example of a condition hierarchy shown in FIG. 2, an application programmer can design a program that generates the following output for a menu item:

```
<menu item>
    Return
    <desktop>
    Generate Return Directions
    </desktop>
    <voice>
    Generate Return Directions
    </voice>
    <phone>
    Rtrn. Dir.
        <TC 441 V2>
        Generate Return Directions
        </TC 441 V2>
    </phone>
</menu item>
```

When the middleware transformer receives this condition-independent output, the transformer determines the type of client to which the output is to be sent and generates condition-specific output. Specifically, for all clients other than desktop clients, voice clients, and phone clients, the menu item is "Return". For desktop clients, voice clients and the specific phone model TC 441 V2, the menu item is "Generate Return Directions". Finally, for phone models other than TC 441 V2, the menu item is "Rtrn. Dir." The special treatment of model TC 441 V2 may be desired, for example, if the TC 441 V2 is able to display longer menu items than conventional mobile phones.

In one embodiment, after the condition-specific output has been created, an XSL style sheet may be applied to format the output according to the needs of the client to which the output is to be sent. In an alternative embodiment, in addition to the output processing described above, the middleware transformer formats the output for the specific device, either by applying one or more XSL style sheets or by any other means.

In order for the middleware transformer to perform the appropriate output transformation, the party that controls the middleware transformer, also known as the "middleware host", maintains data that indicates (1) the condition hierarchy, (2) the tags associated with the nodes of the condition hierarchy, and (3) the correlation between the nodes of the condition hierarchy and request-conditions.

For example, assume that the middleware transformer supports the condition hierarchy illustrated in FIG. 2. The middleware host may maintain data that indicates various types of information, such as the association of the tags in the XML to the nodes of the condition hierarchy and the relationship of the nodes to each other. Below are representative examples of the data that may be maintained by the middleware host:

(a) phone node 218 is a child of all devices node 200;
(b) tags <phone> and </phone> are associated with phone node 218;
(c) WML node 230 is a child of phone node 218;
(d) tags <WML> and </WML> are associated with WML node 230;
(e) TC 441 V1 node 242 is a child of WML node 230;
(f) tags <TC 441 V1> and </TC 441 V1> are associated with TC 441 V1 node 242; and
(g) request-condition "client device=TC 441 V1" is associated with TC 441 V1 node 242.

The condition hierarchy may be developed by the service provider or development provider. By incorporating the use of a condition hierarchy in an application, the service provider may support either broad classes of devices, such as PDA's, more narrow classes of devices, such as Unix desktop computers, or specific devices, such as Nokia model 7110 phone. The application developer may then customize the output for the service based on the capabilities of the devices based upon the broad class, narrow class, or specific device.

F. Producing Output by Matching Request Conditions

When the middleware transformer receives condition-independent output that is to be delivered to a client and the condition-independent output includes a set of alternative output segments, the middleware transformer inspects the relevant request-conditions. For example, if the alternative output segments are associated with different types of client devices, the middleware transformer determines the device type of the client to which the output is to be sent. Based on the applicable request-condition(s), the middleware transformer selects the output segment that most specifically matches the request-condition(s).

Figure 3:
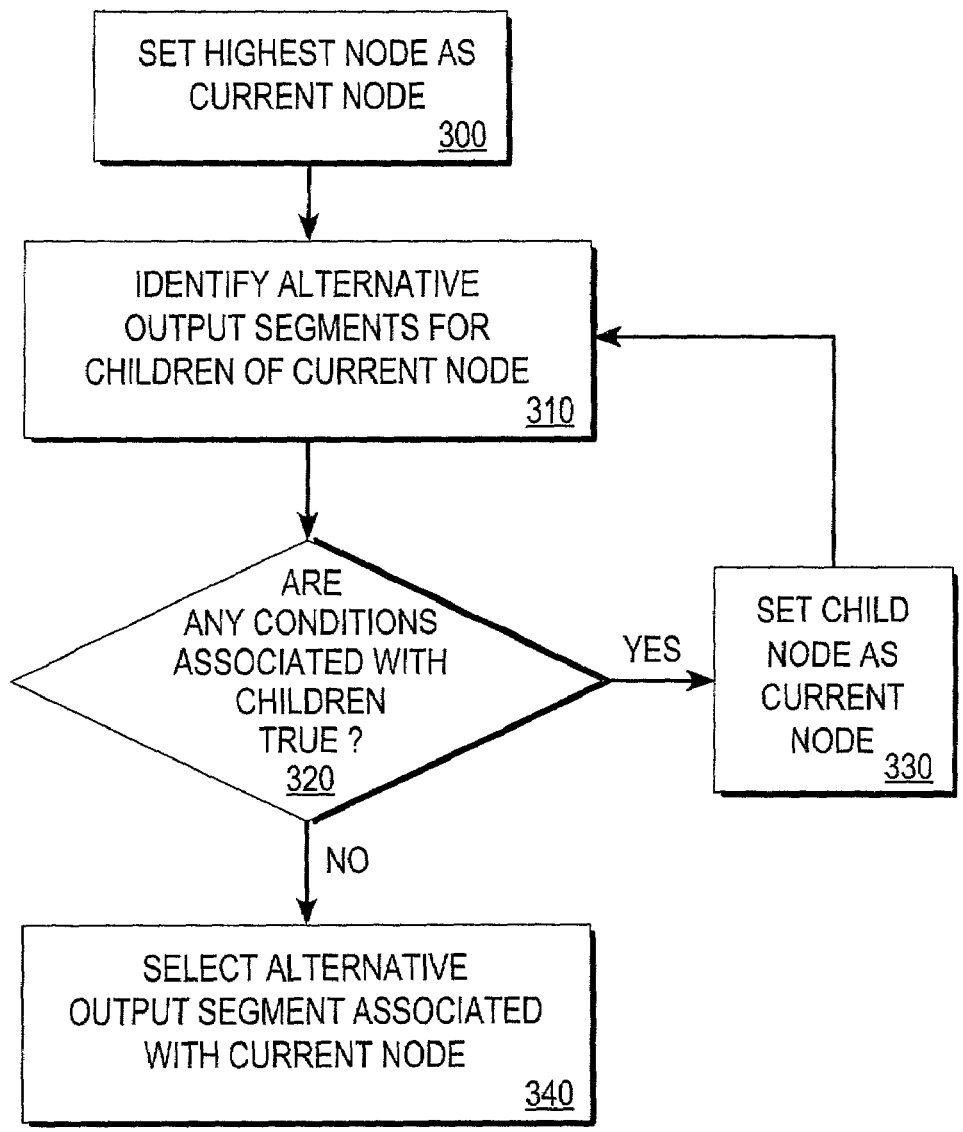
FIG. 3 is a flow diagram that depicts an approach for selecting an alternative output segment, according to one embodiment of the invention.

According to one embodiment, when the middleware transformer receives output that includes alternative output segments, the middleware transformer selects the output segment that most specifically matches the request-conditions via the process outlined in the flowchart of FIG. 3. In step 300, the highest node in the condition hierarchy (e.g. "all devices" node 200 of FIG. 2) is set as the current node.

Next, in step 310, the alternative output segments that correspond to the children of the current node are identified. Referring back to FIG. 2, if the current node is the "all devices" node 200, then the middleware transformer identifies the children as follows: voice node 210, desktop node 212, PDA node 214, pager node 216, and phone node 218.

In step 320, a determination is made about whether any of the conditions associated with the identified children of the current node are true. For example, if the device making the service request is a pager, then the condition associated with pager node 216 would be true, but the condition associated with phone node 218, as well as the other child nodes of "all devices" node 200, would not be true. Conversely, if the device was a phone, then the condition associated with phone node 218 would be true and the remaining conditions associated with the remaining childe nodes of "all devices" node 200 would not be true.

If a condition associated with a child of the current node is true, then step 330 sets that child node as the new current node and the process loops back to step 310. For example, if the current node is "all devices" node 200 and the device is a pager, then the condition associated with pager node 216 is true. According to step 330, pager node 216 is set as the current node and the process returns to step 310.

If no condition associated with any child of the current node is true, then step 340 selects the output segment associated with the current node. For example, if the current node is "all devices" node 200 and the device requesting the service is a brand new type of futuristic device unknown when the condition hierarchy was created, then perhaps none of the conditions associated with any the child nodes of "all devices" node 200 would be true. Therefore, according to step 340, the output segment associated with the current node, which is "all devices" node 200 in this example, is selected. For example, the output associated with "all devices" node 200 may be capable of display on any device (e.g., the lowest common denominator approach), or the output may be capable of display on devices with a higher minimum capability level.

For example, assume that the condition-independent output of an application is as follows, wherein the alternative segment tags correspond to the nodes shown in FIG. 2:

<menu item>
  Return
  <desktop>
    Generate Return Directions
  </desktop>
  <voice>
    Generate Return Directions
  </voice>
  <phone>
    Rtrn. Dir.
    <WML>
      Return Directions
      <TC 441 V2>
        Generate Return Directions
      </TC 441 V2>
    </WML>
  </phone>
</menu item>

Further assume that the client to which the output is to be sent is a device identified by the nomenclature "TC 441 V1". The condition associated with TC 441 V1 node 242 in FIG. 2, as well as the conditions associated with all nodes from which the TC 441 V1 node descends (i.e., phone node 218 and WML node 230), are TRUE.

To determine which of the alternative output segments to use in the XML given above, the middleware transformer initially establishes "all devices" node 200 as the current node, according to step 300 of FIG. 3.

The middleware transformer then identifies the alternative output segments that correspond to the children of the current node. In the present example, the alternative output segments that correspond to the children of "all devices" node 200 are the output segments associated with voice node 210, desktop node 212, and phone node 218. As shown in the condition-independent output above, not all of the child nodes shown in FIG. 2 for "all devices" node 2000 have a corresponding alternative output segment. Thus, the application developer may only support some of the classes, types or specific devices included in the condition hierarchy.

The middleware transformer then determines whether any of the conditions associated with the identified children of the current node are true, as specified by step 310. In the present example in which it is assumed that the device is a TC 441 V1, the condition associated with phone node 218 is true. Consequently, phone node 218 is established as the new current node per step 330.

Returning to step 310 with phone node 218 set as the current node, the middleware transformer identifies the alternative output segments that correspond to the children of phone node 218, namely WML node 230, since there are no alternative output segments provided in the XML above that correspond to the other child nodes of phone node 218 shown in FIG. 2.

Per step 320, the middleware transformer determines whether any of the conditions associated with the identified child nodes are true. In the present example, the only alternative output segment with a condition that is true is the alternative output segment associated with WML node 230. Consequently, WML node 230 is established as the new current node per step 330.

Returning to step 310 with WML node 230 set as the current node, the middleware transformer identifies the alternative output segments that correspond to the children of WML node 230. In the present example, the only alternative output segment that corresponds to a child of WML node 23—is the output segment associated with the TC 441 V2 node 244. No alternative output segments are provided in the XML above for the other child nodes of WML node 230 shown in FIG. 2 (i.e., Nokia 7110 node 240 and TC 441 V1 node 242).

Per step 320, the middleware transformer then determines whether any of the conditions associated with the identified children of the current node are true. In the present example, the condition associated with TC 441 V2 node 244 is not true because the client to which the output was assumed to be sent to is a TC 441 V1, not a TC 441 V2. Consequently, the output segment associated with WML node 230 is selected. The condition-independent output may thus be transformed into:

<menu item>
    Return Directions
  </menu item>

The example above illustrates how the best match can be identified for a particular device, even if there is no exact match. The lack of an exact match may be due to a number of reasons, such as that device-specific output is not required and/or desired. The lack of an exact match may also be due to the device being new and thus the developer did not know of the new device and the capabilities of the new device when designing the application. Yet the new device can still receive output that is suitable for a phone in the example above instead of default output or output that is for another class of device, such as desktop computers.

The foregoing example is merely one technique that may be used by the middleware transformer to select the output segment that most specifically matches the request-conditions. Various alternative techniques may be used. For example, in one alternative technique, each tag may be assigned a number that corresponds to the level within the condition hierarchy of its corresponding node. Thus, <WML> could be assigned 3 and <phone> could be assigned 2. The appropriate output segment of a set of alternative output segments may then be chosen by (1) identifying, within the condition-independent output, the tags that correspond to true conditions, and (2) selecting, from among those tags, the tag that has been assigned the highest value.

In the foregoing description, the request-condition used to select the appropriate output segment is the device type of the client to which the output is to be supplied. However, the request-condition used to select between alternative output segments may vary from implementation to implementation. For example, in one implementation, the alternative output segments in a set may each be associated with a different congestion level of the network. In another implementation, the alternative output segments in a set may each be associated with a different class of end-user. In yet other implementations, the alternative output segments may be associated with combinations of factors. For example, a particular output segment may be specified for use when (1) a particular class of user is using (2) a particular type of client device, and (3) has a connection that supports a particular transfer rate.

Further, the foregoing description gives examples in which the output is in the form of a mark-up language, such as XML. However, the nature of the output may vary from implementation to implementation. The techniques described herein may be used with any form of condition-independent output that includes (1) alternative output segments, and (2) some form of hints that may be used to select between the alternative output segments based on request-conditions.

G. Selecting Output Based on the Language Supported by the Client Device

Use of the <WML> tag in the example above illustrates a situation in which the request condition used to select an alternative output segment relates to the markup or programming language supported by the client device to which the output is to be sent. According to one embodiment, an alternative output segment associated with a "supported-programming-language" request condition may include, partially or entirely, code written in the supported programming language.

For example, the output segment placed between the <WML> and </WML> tags may consist entirely of WML code. Consequently, when the client device supports the WML language, the output sent to the client is in the WML language. While the WML language is used in this example, the technique may be used for any programming language, including but not limited to "C++", HTML, Visual Basic, or Java.

H. Using a Middleware Transformer to Transform Condition-independent Output

Numerous benefits are realized by using a middleware transformer hosted by the middleware host to transform the condition-independent output prior to supplying the output to a client. For example, through this technique, the mobile application enjoys every-device support by virtue of the middleware host providing device-specific format and protocol transformations for new devices as the new devices are developed. Further, when the mobile application uses the alternative output segment techniques described above, the mobile application developer is able to provide users with output in which the content is based on conditions associated with the request, without designing applications that are able to detect those conditions.

In one embodiment, the content of the output received by a client may be tailored to the device type of the client without the mobile application being aware of the device type of the client to which the output is sent. For example, the client device may be a pager. By using an XSL style sheet as discussed above to transform the application output, such as output in portal-to-go XML, the middleware transformer can generate device-specific formatting for the pager.

Furthermore, the content of the output received by a client may be automatically tailored to new types of clients, based on the categories to which those new clients have been assigned, without the application developer even being aware of the new types of clients. For example, when a new type of WAP phone is developed, the middleware host will classify the new WAP phone at the appropriate location in the condition hierarchy. Consequently, the new WAP phone will automatically receive those alternative output segments associated with WAP phones, if any are specified in the output from the service application.

If a particular set of alternative output segments does not have an output segment associated with WAP phones, but does have an output segment associated with mobile phones, then the new phone will automatically receive the alternative output segment associated with mobile phones. In this manner, the content of the output delivered to new devices is device-specific, with the level of specificity determined by the application developer, even for newly developed devices that the application developer knows nothing about when creating the application.

I. Example of Producing Output Using a Shared Hosted Application

Figure 4:
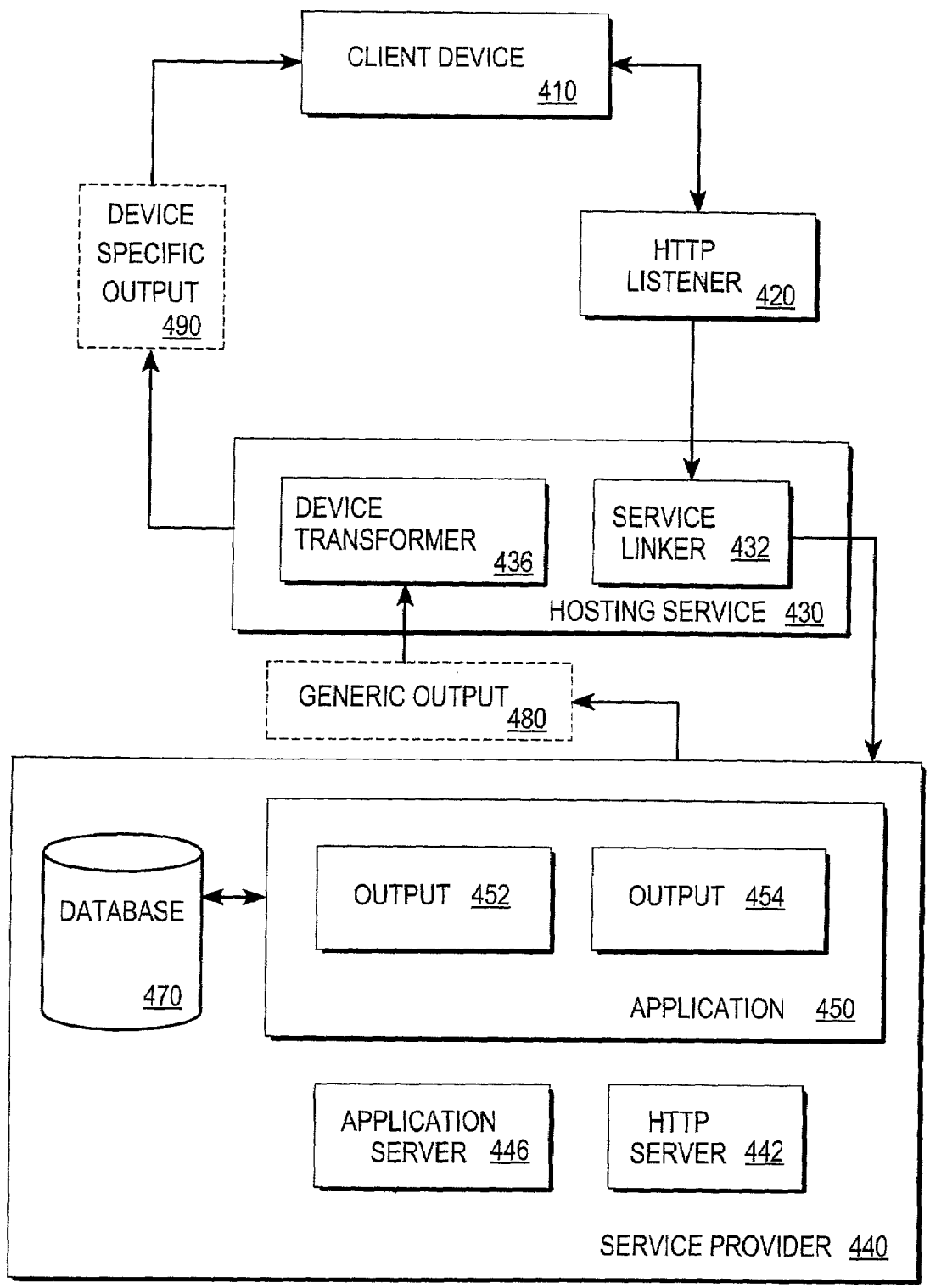
FIG. 4 is a block diagram illustrating an example of producing output using a shared hosted application, according to one embodiment of the invention.

FIG. 4 is a block diagram illustrating an example of producing output using a shared hosted application, according to one embodiment of the invention. FIG. 4 illustrates a client device 410, such as a laptop computer or mobile phone, that is connected to an HTTP listener 420, such as a web server that provides web pages in response to requests. HTTP listener 420 may provide client device 410 with a web page containing a list of services associated with a hosting service 430. Upon selection of a particular service by client device 410, HTTP listener 420 sends a request for the particular service to a service linker 432 that is part of hosting service 430. Service linker 432 may be implemented on one or more servers associated with hosting service 430. Upon receipt of the request, service linker 432 identifies the service or application that is the subject of the request and forwards the request from client device 410 to a service provider 440.

Service provider 440 includes an HTTP server 442 for handling communications between service provider 440 and other servers, such as service linker 432 or servers linked together as part of the Internet. Service provider 440 also includes an application server 446 for directing requests received by HTTP server 442 to the appropriate application.

Service provider 4420 also includes an application 450 that is the subject of the request from client device 410 in this example. For example, application 450 may be a dining directory module that provides a listing of restaurants in a city specified by an end user via a client, such as client device 410. Application 450 may be capable of generating several sets of output, such as output 452 and output 454, depending on the request. For example, output 452 may be a prompt for the end user to supply the name of a city for which a listing of restaurants is desired.

Service provider 440 also includes a database 470. For example, if application 450 is a dining directory module, database 470 may include information about restaurants in a number of cities. Upon selection of a particular city by the end user, application 450 may generate output 454 that includes a listing of restaurants in the chosen city.

Service provider 440 responds to the request received from client device 410 via service linker 432 with a generic output 480. For example, generic output may be an electronic document containing portal-to-go XML.

Generic output 480 is sent from service provider 440 to hosting service 430, where the generic output is processed by a device transformer 436. Device transformer 436 may be a server that functions as a middleware transformer by applying style sheets to generic XML output to a customized output 490, as described above. Customized output is then sent to client device 410 for display to the end user.

IV. ACCESSING OTHER APPLICATIONS AND SERVICES

A. Mobile Modules

Service providers and application developers can build hosted or portal applications that are accessed by service requests sent to the intermediary, such as a host, that manages middleware transformer. According to one embodiment, the services or applications, also referred to herein as "mobile modules," can generate output that results in calls to other mobile modules. The output may, for example, use a particular set of tags, such as <substitute> </substitute> to indicate a substitute command that makes reference to another mobile module, and include within the tags an identifier for the mobile module.

For example, the output generated by the mobile module of a first party (party 1) may refer to another mobile module of second party (party2) by including the following set of statements:

<substitute>
party2-module-identifier
</substitute >

In response to receiving the output immediately above, the middleware transformer may invoke the mobile module of the second party identified by "party2-module-identifier", embed the output of that module into the output from the mobile module of the first party, and deliver the combined output to the client. This feature allows the designer of one mobile module to take advantage of the functionality of all other mobile modules that may be available on the intermediary (e.g., the host). This feature also allows the transaction with the previous service to be kept active, as well as allowing the services to be used without having to know who is using the services.

Also, this feature is different from linking of objects among web pages where the browser running on a client. For example, if a browser receives a web page that has a link to an object, the browser sends a request to the address specified by the link, receives an object in response, and then incorporates the object into the web page that is displayed by the browser. Thus, it is the browser running on the client that requests, receives, and incorporates the object into the web page.

In contrast, in the embodiment above, the intermediary receives output (e.g., at the middleware transformer) from one module, makes a request to another module, receives output from the other module, and then incorporates the output of both modules together and then sends the combined output to the client. Thus, it is the intermediary, not the client, that requests, receives, and incorporates the output of the second service into that of the first service.

According to another embodiment, not only can the output of one mobile module, referred to as the "calling" mobile module, cause the invocation of another mobile module, referred to as the "called" mobile module, but the calling mobile module may also pass parameters to the called mobile module. For example, the output of the calling mobile module may include code of the following form:

<link>
called-module-identifier param1 param2 param3
</link>

The example immediately above would pass parameters "param1", "param2", and "param3" from the calling mobile module to the called mobile module identified by "called-module-identifier."

According to another embodiment, rather than automatically embed output from the called mobile module in its output, the designer of the calling module may simply want to present to the user a link that, if selected, causes invocation of the programming routine of the called mobile module. To indicate that a link is desired, a different set of tags may be used, such as <action> </action>, to denote that an action command is to be executed based on the statements between the <action> and </action> tags.

The intermediary knows when a first mobile module of a first party is being called by a second mobile module of a second party because it is the intermediary's responsibility to perform the invocation required by the substitute command or to perform the invocation required by the action command, such as the selection of a link.

According to one embodiment, the intermediary stores information about which modules invoked which other modules. The information may be used as the basis for business relationships between mobile module designers. For example, the designer of a calling module may negotiate to pay the designer of a called module a certain amount of money every time the calling module invokes the called module. The party providing the intermediary (e.g., hosting services) records the inter-module calls and provides them to the various module owners.

The tracking and management of the business relationships among application providers, or module owners, are not easily implemented outside the hosting framework described herein. For example, on the World Wide Web, a first party may design a first web page that includes a link to a URL associated with a second web page provided by a second party. It is extremely difficult (if not impossible) for the second party to determine whether the second web page is requested in response to users selecting the link on the first web page or whether the second page is requested by other means. Consequently, it is difficult for the second party negotiate a per-use agreement with the first party.

According to yet another embodiment, the host maintains state information at an intermediary about the services accessed by an end user. For example, the intermediary may store an information stack for each session by an end user. The information stack indicates the sequence in which services or mobile modules have called other mobile modules during the session, as well as the identities of the module modules.

According to one embodiment, the mobile modules associated with the services may take advantage of the state information stored at the intermediary using a callback mechanism. For example, along with a link for invoking a called module, the calling module may include callback information. When the host invokes the called module in response to selection of the link, the callback information is stored in a record at the intermediary, such as by placing the callback information on the stack associated with the session. The called module may provide a "done" or "exit" option, control, or object on the content provided by the called module. The end user can select the "done" or "exit" option when the end user is finished with the service provided by the called module. The called module need not have any information or knowledge about the identity of the calling module. Instead, the called module need only identify the "previously" accessed service (i.e., the previously used mobile module) and the intermediary will then identify the previously accessed service based on the stack information.

In response to selection of the "done" option, a message is sent to the host to cause the host to perform the action specified on the top of the information stack. In the above example, the action specified at the top of the information stack is the callback information that was placed there at the time the called module was called. Typically, the callback information will cause the calling module to be invoked once again, and content or output from the called module will be delivered to the end user. From the perspective of the end user, it appears as if the end user is returning to calling module when the end user is done with the called module.

B. Storing Data at an Intermediary

According to one embodiment, data may be stored at an intermediary for use by services that are accessed through the intermediary, and when the applications or mobile modules for the service are executed, the intermediary includes the stored data in the application output in place of variables in the output based on a mapping of those variables to the stored data. The intermediary, which may be a host, stores both the data, or values or information items, and a mapping between the information items and the variables, or identifiers. A service may store or update data for an existing variable or store data for a new variable to be added to the mapping.

The content or output generated by a mobile module may include one or more of the identifiers. In response to encountering output that refers to one of the identifiers, the intermediary supplies the corresponding information item before providing the output to the client requesting the output.

For example, for a particular session, the host may store the data item "Mike" mapped to the identifier "name". A module may generate the output:

<SimpleText>
 Hello %name
</SimpleText>

When the host encounters such output in a particular session, the host substitutes the "%name" reference with the corresponding data item "Mike", resulting in the output:

<SimpleText>
Hello Mike
</SimpleText>

According to one embodiment, the service providers and developers of the mobile modules can register with the host the data and identifiers to be maintained by the host. The designers of those modules may thereby free themselves of the burden of durably maintaining information, and yet get the benefit of durably maintained information by merely including the appropriate identifiers in their output.

In another embodiment, a calling mobile module can set a data item or reference to allow the end user to return to the calling mobile module when the end user is done with the called mobile module. For example, for a particular session, the host may associate the data item "href" to a calling module identifier. A module may generate output to create a link to the called mobile module using this data item as the first parameter as follows:

<action>
called-module-identifier %href
</action>

When the host encounters this output in that particular session, the host substitutes the "%href" reference with the calling module identifier resulting in the following output:

<action>
called-module-identifier calling-module-identifier
</action>

As a result, when the client uses the link to the called module, the calling module identifier is passed to the called module as a parameter. The called module may use the calling module identifier to send the client back to the calling module when the client is done with the called module.

In another embodiment, prior to executing a link to another service or called mobile module, a data item can be stored at the intermediary that contains a reference to the previous service or calling mobile module. The other service or called mobile module may then provide an object, such as a "done" or "exit" control or button on a web page, that includes a label or variable such as "%previous." When the intermediary encounters the "%previous" variable in the output from the other service, the intermediary substitutes a reference to the previous service or calling mobile module, thus allowing the end user to return to the previous service by selection the object on the web page from the called mobile module.

While the above examples uses variables, or identifiers, such as "%name" to denote a name of an end user and "%href" to pass the calling module identifier to the called module, respectively, other variables may be used to refer to other data that will only be set or known when the application is executed. For example, labels can be used to get the date or time when the application is run or a specific request by a client is made.

V. HARDWARE OVERVIEW

Figure 5:
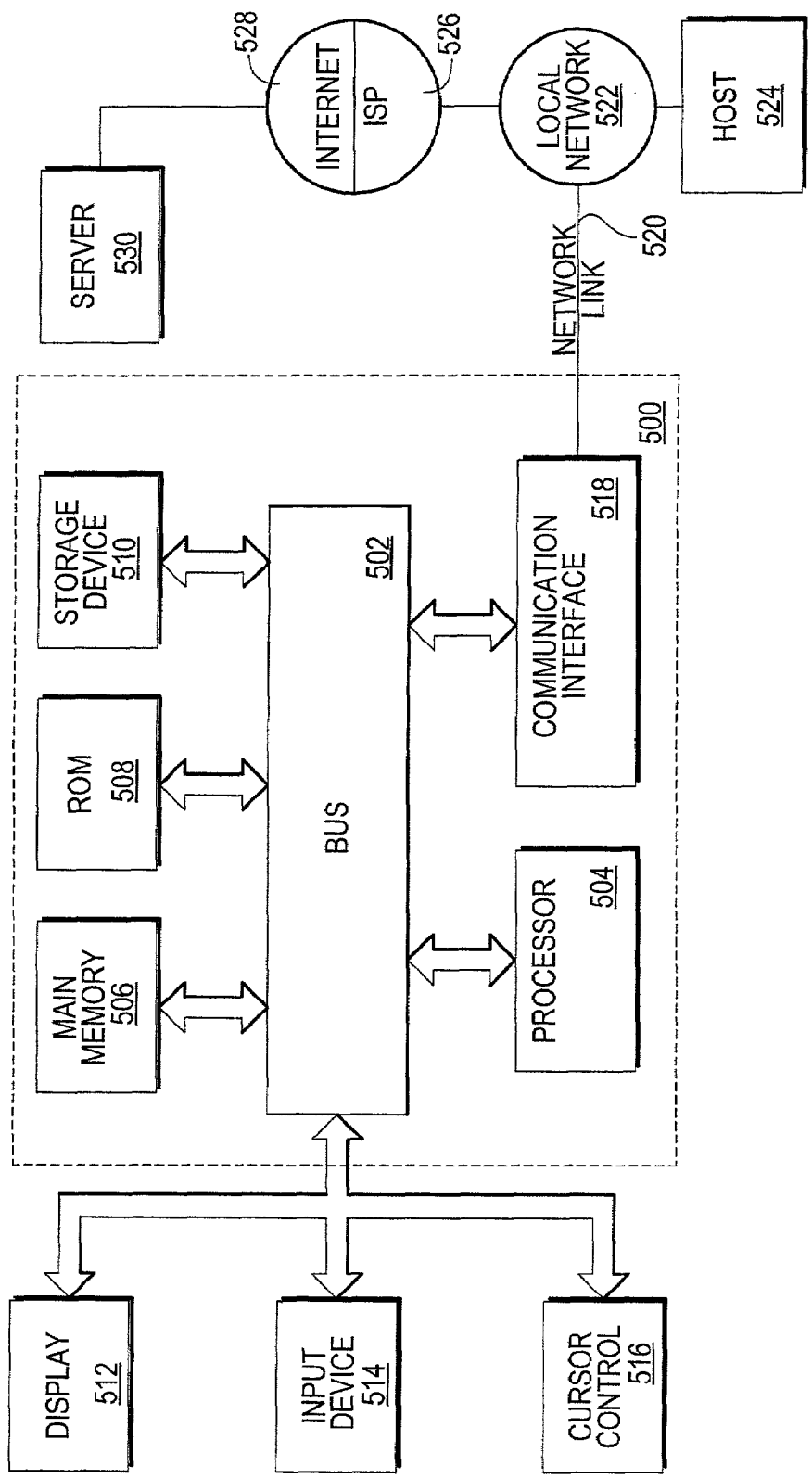
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for developing applications online, the method comprising the computer-implemented steps of:
   receiving a first request from a first user using a first browser running on a first client;
   in response to said first request, providing a first electronic document that generates a first interface when said first electronic document is displayed by said first browser, wherein said first interface includes a first edit field for said first user to type in application code;
   receiving said application code that is typed in said first edit field by said first user, wherein said application code is submitted by said first interface in response to said first user selecting a first object included in said first interface; and
   storing said application code at a server that is remote from said first client, wherein said application code can be executed from said server in response to a first service request from a first end user.

2. The method of claim 1, further comprising the computer-implemented step of:
   retrieving existing application code from said server in response to a second request from a second user using a second browser running on a second client;
   providing a second electronic document that generates a second interface when said second electronic document is displayed by said second browser, wherein said second interface includes a second edit field that displays said existing application code that said second user can edit by typing;
   receiving modified existing application code that is submitted by said second interface in response to said second user selecting a second object included in said second interface; and
   storing said modified existing application code at said server that is remote from said second client, wherein said modified existing application code can be executed from said server in response to a second service request from a second end user.

3. The method of claim 1, further comprising the computer-implemented step of:
   retrieving existing application code from said server in response to a second request from a second user using a second browser running on a second client;
   providing a second electronic document that generates a second interface when said second electronic document is displayed by said second browser, wherein said second interface includes a second edit field that displays said existing application code; and
   deleting said existing application code in response to said second user selecting a second object included in said second interface.

4. The method of claim 1, wherein said server is associated with an intermediary and wherein said first electronic document is provided by said intermediary.

5. The method of claim 1, wherein said server is associated with a service, wherein said first electronic document is provided by an intermediary, and wherein said first service request is received by said intermediary.

6. A computer-readable medium carrying one or more sequences of instructions for developing applications online, wherein execution of the one or more sequences of instructions by one or more processors causes the one or more processors to perform the steps of:
   receiving a first request from a first user using a first browser running on a first client;
   in response to said first request, providing a first electronic document that generates a first interface when said first electronic document is displayed by said first browser, wherein said first interface includes a first edit field for said first user to type in application code;
   receiving said application code that is typed in said first edit field by said first user, wherein said application code is submitted by said first interface in response to said first user selecting a first object included in said first interface; and
   storing said application code at a server that is remote from said first client, wherein said application code can be executed from said server in response to a first service request from a first end user.

7. The computer-readable medium of claim 6, further comprising instructions which, when executed by the one or more processors, cause the one or more processors to carry out the steps of:
   retrieving existing application code from said server in response to a second request from a second user using a second browser running on a second client;
   providing a second electronic document that generates a second interface when said second electronic document is displayed by said second browser, wherein said second interface includes a second edit field that displays said existing application code that said second user can edit by typing;

receiving modified existing application code that is submitted by said second interface in response to said second user selecting a second object included in said second interface; and storing said modified existing application code at said server that is remote from said second client, wherein said modified existing application code can be executed from said server in response to a second service request from a second end user.

8. The computer-readable medium of claim 6, further comprising instructions which, when executed by the one or more processors, cause the one or more processors to carry out the steps of:

retrieving existing application code from said server in response to a second request from a second user using a second browser running on a second client;

providing a second electronic document that generates a second interface when said second electronic document is displayed by said second browser, wherein said second interface includes a second edit field that displays said existing application code; and deleting said existing application code in response to said second user selecting a second object included in said second interface.

9. The computer-readable medium of claim 6, wherein said server is associated with an intermediary and wherein said first electronic document is provided by said intermediary.

10. The computer-readable medium of claim 6, wherein said server is associated with a service, wherein said first electronic document is provided by an intermediary, and wherein said first service request is received by said intermediary.

* * * * *